US010366442B1

(12) United States Patent
Oczkowski et al.

(10) Patent No.: US 10,366,442 B1
(45) Date of Patent: Jul. 30, 2019

(54) SYSTEMS AND METHODS TO UPDATE SHOPPING CART

(71) Applicant: Amazon Technologies, Inc., Seattle, WA (US)

(72) Inventors: Sean Joseph Henry Oczkowski, Seattle, WA (US); Sumeet Khushalani, Seattle, WA (US); Igor Fred Robert von Nyssen, Seattle, WA (US); Remya Narayanaswami, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 612 days.

(21) Appl. No.: 14/751,520

(22) Filed: Jun. 26, 2015

Related U.S. Application Data

(60) Provisional application No. 62/157,650, filed on May 6, 2015.

(51) Int. Cl.
G06Q 30/06 (2012.01)
(52) U.S. Cl.
CPC ..... G06Q 30/0633 (2013.01); G06Q 30/0631 (2013.01)
(58) Field of Classification Search
None
See application file for complete search history.

(56) References Cited

U.S. PATENT DOCUMENTS

| | | | | |
|---|---|---|---|---|
| 2006/0026206 A1* | 2/2006 | Loghmani | ............... | G06Q 30/06 |
| 2008/0189187 A1* | 8/2008 | Hao | ....................... | G06F 17/243 |
| | | | | 705/26.41 |
| 2010/0121637 A1* | 5/2010 | Roy | ....................... | G10L 15/22 |
| | | | | 704/235 |
| 2016/0189286 A1* | 6/2016 | Zohar | ................ | G06K 9/00355 |
| | | | | 348/150 |
| 2016/0247542 A1* | 8/2016 | Tanaka | ................... | G06F 16/60 |

* cited by examiner

Primary Examiner — Scott A Zare
(74) Attorney, Agent, or Firm — Pierce Atwood, LLP

(57) ABSTRACT

Devices, methods, and systems for improving the customer experience and simplifying the purchase of items are disclosed. In general the devices, methods, and systems allow a customer to speak a name or type of item, or scan a code (such as a barcode) of an item, and the item is automatically added to a shopping cart of the customer. For example, speech recognition and machine learning techniques may be used to process audio input and identify potential products relating to the input. When there is a high confidence that an identified product is the product the customer intended to purchase, the identified product is automatically added to the customer's shopping cart. When the confidence is not high enough, a list of potential products may be generated and added to the customer's shopping cart. The customer may then select the intended product right from the list in the shopping cart.

20 Claims, 12 Drawing Sheets

SYSTEMS AND METHODS TO UPDATE SHOPPING CART

CROSS REFERENCES TO RELATED APPLICATIONS

This application claims priority to U.S. Provisional Patent Application Ser. No. 62/157,650, filed May 6, 2015, entitled AUDIO COMMANDS TO UPDATE SHOPPING CART, in the names of von Nyssen et al., the disclosure of which is expressly incorporated by reference herein in its entirety.

BACKGROUND

Human-computer interactions have progressed to the point where humans can control computing devices, including gaming devices, and provide input to those devices, by speaking. Such systems or devices employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

BRIEF DESCRIPTION OF DRAWINGS

For a more complete understanding of the present disclosure, reference is now made to the following description taken in conjunction with the accompanying drawings.

DETAILED DESCRIPTION

An increasing number of devices are emerging that customers can use to shop for and purchase items from merchants via the internet. However, most merchants require customers to perform certain steps, such as search for an item on a website of the merchant and add the item to an electronic shopping cart prior to purchasing the item. To improve the customer experience and simplify the purchase of items, systems and methods are disclosed that allow the customer to speak a name or type of item, scan a code (such as a barcode) of an item, or input text (e.g., a text message or post on a social media website such as Twitter) and the item is automatically added to a shopping cart of the customer.

In an embodiment, the customer may speak or input a type of item (such as "apples") via audio or text. In this situation, the customer may not specify which kind of apples. Thus, the systems and methods may search for apples and determine a list of potential items (i.e., types of apples, quantities of applies, suppliers of apples, or the like) based on the customer's past shopping history, customer clustering, etc. Each potential type of apple may also be associated with a confidence score, and the apple with the highest score may be added to the customer's shopping cart. The customer may then be notified that the apple has been added to the shopping cart. Alternatively, the list of potential items may be added to the shopping cart for the customer to select from.

In another embodiment, the customer may simply scan a code of an item or input text of an item that matches an exact item the merchant has in stock. In this situation, the item is simply added to the customer's shopping cart. However, when the item is not in stock, the systems and methods may search for potential equivalent items based on the name of the item and keywords associated with the item, generate a list of potential items, and determine a confidence score for each item as mentioned above. The list of potential items may be added to the shopping cart for the customer to select from or the item with the highest confidence score may simply be added to the shopping cart. When the item associated with the code is unknown, the systems and methods may prompt the customer to speak or input text corresponding to the name of the product, and proceed as described above.

Figure 1:
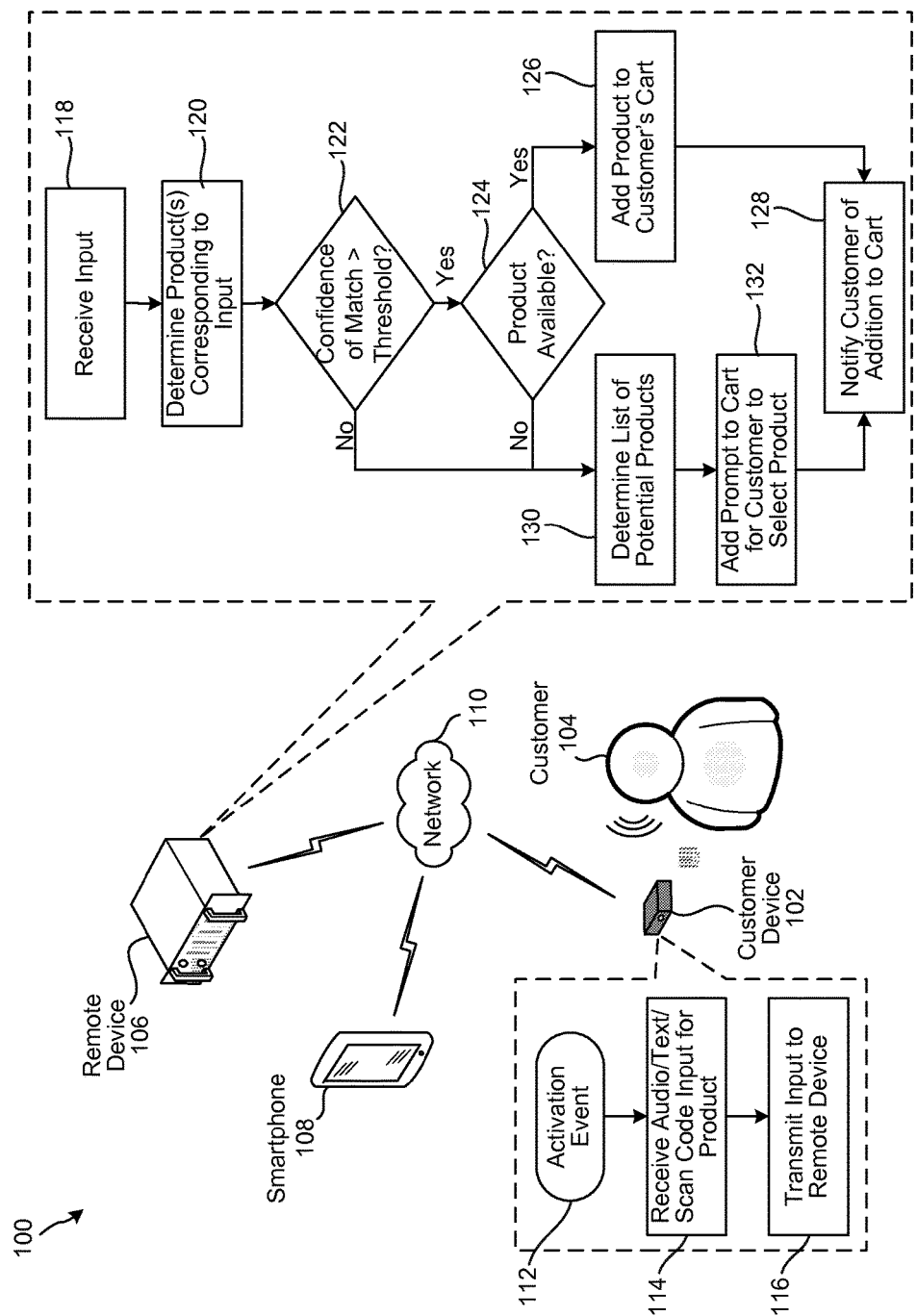
FIG. 1 illustrates an overview of a system for implementing embodiments of the present disclosure.

FIG. 1 illustrates an overview of a system 100 for implementing embodiments of the disclosure. The system includes a customer device 102 that a customer 104 may interact with, a remote device 106, and another device of the customer (such as a smartphone 108). The customer device 102, remote device 106, and smartphone 108 may be in communication with one another via a network 110. The customer device 102 may be activated in response to an activation event, illustrated as block 112. The activation event may be the customer 104 turning the customer device 102 on, pressing a button on the customer device 102, uttering a certain key word (also known as a wake word), and/or other such action. In response to the activation event, the customer device 102 may scan a code of a product, receive a textual input, or listen for audio input from the user 104. The customer device 102 receives the audio/text/scan code input corresponding to an item (or product), illustrated as block 114.

The customer device 102 may then transmit the input (which may be the audio, the text or a number corresponding to the scan code) to the remote device 106 (such as one or more remote servers), illustrated as block 116. The customer device 102 may also include a device identifier (ID). The device ID may be associated with a customer or customer ID associated with a customer profile. When transmitting the input to the remote device 106, the customer device 102 may also transmit the device ID. This informs the remote device 106 of the customer 104 associated with the input, and a profile of the customer, including a customer name, shipping address, shopping cart, billing information, etc.

The remote device 106 receives the input, illustrated as block 118, and determines data corresponding to the input. The remote device 106 then determines one or more products corresponding to the input or data corresponding to the input, illustrated as block 120. When the input is a scan code, the remote device 106 may determine the one or more products by interpreting the scan code and obtaining the data corresponding to the scan code (such as product name, keywords, etc.). Similarly, When the input is text, the remote device 106 may determine the one or more products by interpreting the text and/or using the text as data in a search to obtain data corresponding to the text (such as product type, name, keywords, etc.). For example, the scan code or text may correspond to a 10 lb bag of Gala apples, and the remote device 106 determines that the scan code or text corresponds to such a product. This data may then be used as a look-up in a product database (also referred to as an item database) to identify one or more products (also referred to as items) associated with the data (such as one or more 10 lb bags of Gala apples).

When the input is audio input, the remote device 106 may determine the one or more products by processing the audio input using automatic speech recognition (ASR) and/or natural language understanding (NLU) to obtain text data and other data corresponding to the audio input, as described in further detail below. This processing may result in text corresponding to the audio input. This text may then be used to search a product database to identify one or more products corresponding to the text. For example, the audio input may be "apples," and the remote device 106 determines that the input corresponds to "apples" and identifies one or more apple products (such as a 10 lb bag of Gala apples, 20 lb bag of Gala apples, 10 lb bag of Fuji apples, 20 lb bag of Fuji apples, etc.).

The remote device 106 may have a large amount of computing power and be connected to numerous databases (such as product databases, customer information databases, etc.). This allows the remote device 106 to process the input, and determine one or more products corresponding to the input. For example, the remote device 106 may determine a first product and a second product potentially corresponding to the input based on matching of one or more keywords associated with product data (also referred to as item data) in a product database and/or a purchase history of the customer. The remote device 106 may also determine confidence scores corresponding to how confident the remote device 106 is that the first and second products match what the input intended. For example, the remote device 106 may determine a first confidence score corresponding to a confidence that the first product matches what the input intended, and a second confidence score corresponding to a confidence that the second product matches what the input intended.

The remote device 106 may apply one or more machine learning techniques in determining the one or more products and the confidence scores. For example, machine learning techniques may be used to train and/or operate models corresponding to specific customers and/or groups of customers. In machine learning techniques, an adaptive system is "trained" by repeatedly providing it examples of data and how the data should be processed using an adaptive model until it can consistently identify how a new example of the data should be processed, even if the new example is different from the examples included in the training set from which it learned. Getting an adaptive model to consistently identify a pattern is in part dependent upon providing the system with training data that represents the desired decision features in such a way that patterns emerge. For example, if a customer repeatedly purchases 10 lb bags of Gala apples and the audio input corresponds to "apples," it can be determined with high confidence that with the input of "apples," the customer actually means a 10 lb bags of Gala apples.

Once the remote device 106 determines the confidence scores, the remote device 106 compares the confidence scores to a threshold value to determine whether a confidence score of a product is greater than the threshold value (such as 90%), illustrated as block 122. When a confidence score is greater than the threshold value, the remote device 106 may check to ensure the product is available or in stock, illustrated as block 124, and add the product corresponding to the confidence score to an electronic shopping cart of the customer, illustrated as block 126. Further, if more than one confidence score corresponding to different products is greater than the threshold value, the remote device 106 may add the product with the highest confidence score to the customer's shopping cart. For example, the remote device 106 may determine that a first confidence score of a first product (e.g. 10 lb bag of Gala apples—95%) is greater than the threshold value (90%) and greater than a second confidence score of a second product (e.g. 10 lb bag of Fuji apples—5%), and add the first product to the electronic shopping cart. The remote device may also notify the customer of the product being added to the customer's shopping cart, illustrated as block 128. In an example, the remote device 106 may send a message to the customer's smartphone 108 that the product has been added to the customer's shopping cart (i.e., a 10 lb bag of Gala apples has been added to your shopping cart).

When none of the products the remote device 106 identified has a confidence score greater than the threshold value, or a product is not available or is out of stock, the remote device 106 may determine a list of potential products corresponding to the input, illustrated as block 130. This list of potential products may include a plurality of products determined based on the input, customer popularity, purchase history, demographic data, etc. For example, if the input is "apples" and none of the identified products has a confidence score greater than the threshold value, the remote device 106 may determine a list including a 5 lb bag of Gala apples, 10 lb bag of Gala apples, 20 lb bag of Gala apples, 5 lb bag of Fuji apples, 10 lb bag of Fuji apples, 20 lb bag of Fuji apples, etc., by searching a product database using known search and keyword matching techniques.

The remote device 106 may generate or determine the list substantially at the time the remote device 106 receives the input, and the list may be placed in the customer's shopping cart. The remote device 106 may also store a prompt to generate or determine the list when the customer 104 accesses the customer shopping cart. This ensures the list is up to date with the current availability (i.e., in stock/out of stock) data.

The remote device 106 may add a prompt to the customer's shopping cart, prompting the customer to select a product, illustrated as block 132. The remote device 106 may also notify the customer of the list of products being added to the customer's shopping cart, illustrated as block 128. For example, the remote device 106 may send a message stating: "Sorry for the inconvenience, we are unsure which product you intend to purchase. 5 lb bags of Gala apples, 10 lb bags of Gala apples, 20 lb bags of Gala apples, 5 lb bags of Fuji apples, 10 lb bags of Fuji apples, 20 lb bags of Fuji apples are available. Please select one of the available products if desired." The customer selection may be added to the cart. The customer selection may also then be used as training data, and fed back into the systems and methods to update a customer history and/or to update the algorithms/models used to select products. Thus, the next time, the customer input relates to "apples," the past selection may receive a higher confidence score and be identified as the intended product. In this later situation, if apples are again input the past selection may be directly added to the customer's shopping cart instead of sent to the user for disambiguation from among a list of potential products.

Figure 2:
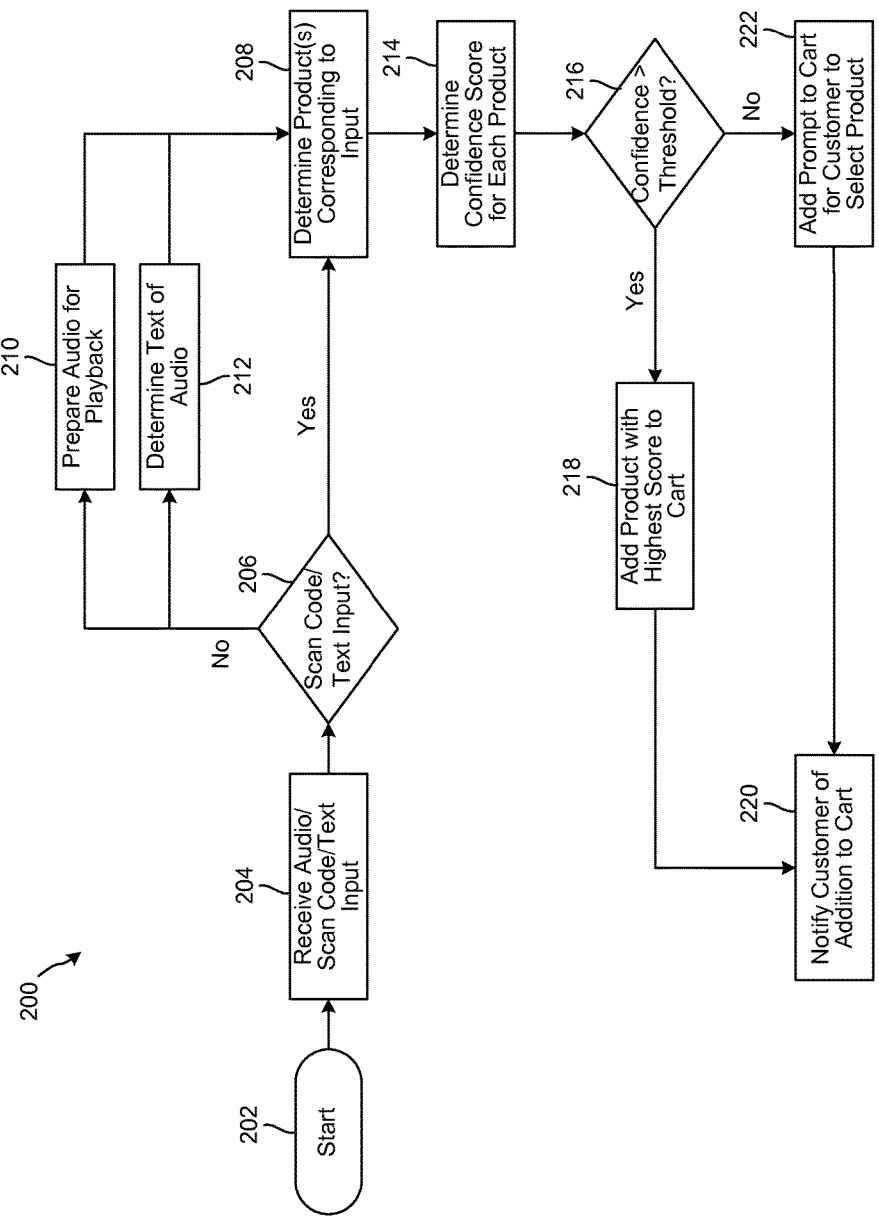
FIG. 2 illustrates an exemplary method of processing an input and updating an electronic shopping cart according to embodiments of the present disclosure.

FIG. 2 illustrates an exemplary method 200 of processing an input and updating an electronic shopping cart according to embodiments of the present disclosure. In block 202, the process starts. The customer device may receive and send an audio, textual, or scan code input to the remote device. The remote device receives the input, illustrated as block 204. The remote device then determines whether the input is a scan code, text, or audio, illustrated as block 206. When the input is a scan code or text, the remote device may determine a product corresponding to the scan code or text, illustrated as block 208. For example, the remote device may interpret the scan code or text and obtaining data corresponding to the scan code or text (such as product name, keywords, etc.). This data may then be used as a look-up in a product database to identify a product associated with the data.

When the input is an audio input, the remote device may process the audio to prepare the audio for playback to the customer, illustrated as block 210. For example, the audio may be processed to include headers, etc. and be configured for play in an MP3, MIDI or other format. In an example, described in further detail below, an optional audio playback feature may be presented to the customer in the customer's shopping cart.

When the input is an audio input, the remote device processes the audio using ASR and NLU techniques as known in the art. For example, the remote device converts the audio input into text, illustrated as block 212. The ASR transcribes audio data into text data representing the words of the speech contained in the audio data. The text data may then be used by other components for various purposes, such as executing system commands, inputting data, etc. The remote device may interpret a spoken utterance in the audio data based on the similarity between the utterance and pre-established language models stored in knowledge base (such as storage 1108 described with reference to FIG. 11). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular word or set of words matches those spoken in the utterance. The confidence score may be based on a number of factors including, for example, the similarity of the sound in the utterance to models for language sounds (e.g., an acoustic model stored in the knowledge base), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process may transform the input audio data into speech recognition data for processing. The ASR process compares the speech recognition data with acoustic models, language models, and other data models and information for recognizing the speech conveyed in the audio data. The ASR process may reduce noise in the audio data and divide the digitized audio data into frames representing a time intervals for which the ASR process determines a set of values, called a feature vector, representing the features/qualities of the utterance portion within the frame. A number of approaches may be used to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR process attempts to match received feature vectors to language phonemes and words as known in the stored acoustic models and language models. The ASR process computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The ASR process may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may processed further using additional techniques, such as natural language understanding (NLU) processing. For example, ASR results in the form of a single textual representation of the speech, an N-best list including multiple hypotheses and respective scores, lattice, etc. may be processed using NLU techniques, such as conversion of the text into commands for execution.

The NLU process may utilize gazetteer information stored in the knowledge base. The gazetteer information may be used for entity resolution, for example matching ASR results with different entities (such as product names, product types, etc.) Gazetteers may be linked to customers (for example a particular gazetteer may be associated with a specific customer's purchase history), may be linked to certain domains (such as shopping), or may be organized in a variety of other ways.

The NLU process takes textual input (such as from ASR processing) and attempts to make a semantic interpretation of the text. That is, the NLU process determines the meaning behind the text based on the individual words and then implements that meaning. NLU processing interprets a text string to derive an intent or a desired action from the customer as well as the pertinent pieces of information in the text that allow a device (e.g., remote device 106) to complete that action. For example, if a spoken utterance is processed using ASR and outputs the text "Gala apples" the NLU process may determine that the user intended to purchase apples and to initiate a purchase with a product matching the entity "Gala." The NLU may process several textual inputs related to the same utterance. For example, if the ASR outputs N text segments (as part of an N-best list), the NLU may process all N outputs to obtain NLU results.

The NLU process may be configured to parse and tag text as part of NLU processing. For example, for the text "Gala apples," "Gala" may be tagged as a specific entity and target of a larger entity "apples". The NLU process may attempt to identify relevant grammars and lexical information that may be used to construe meaning. To do so, the NLU process may identify potential domains that may relate to the received query. For example, a domain may represent a discrete set of activities having a common theme, such as "shopping", etc. As such, each domain may be associated with a particular language model and/or grammar database, a particular set of intents/actions, and a particular personalized lexicon. Each gazetteer may include domain-indexed lexical information associated with a particular customer and/or device (such as customer device 102). For example, a customer's shopping-domain lexical information might include product names, brand names, for example.

In order to generate a particular interpreted response, the NLU process may apply the grammar models and lexical information associated with the respective domain. For instance, a grammar model associated with the shopping domain may include a database of words commonly used when people discuss shopping. The results of NLU processing may be tagged to attribute meaning to the query. So, for instance, "Gala apples" might produce a result of: {domain} shopping, {intent} purchase, and {product name} "Gala apples." The output from the NLU processing (which may include tagged text, commands, etc.) may then be used by other components for various purposes.

The remote device may use the ASR/NLU results to determine one or more potential products corresponding to the audio input, illustrated as block 208. For example, by using the results as a search input and searching one or more product databases. A confidence score that each determined product matches a desired product input by the customer in the audio input, text input, or scan code input, illustrated as block 214. To determine the one or more potential products and confidence scores, the remote device may use machine learning techniques. In machine learning techniques, an adaptive system (such as the remote device) is "trained" by repeatedly providing it examples of data and how the data should be processed using an adaptive model until it can consistently identify how a new example of the data should be processed, even if the new example is different from the examples included in the training set from which it learned. Getting an adaptive model to consistently identify a pattern is in part dependent upon providing the system with training data that represents the desired decision features in such a way that patterns emerge. But provided data with consistent patterns, recognizing such patterns when presented with new and different data is within the capacity of today's systems, and is in fact used by a wide variety of computer systems ranging from handheld personal consumer electronics to complex massively parallel supercomputers. Such efforts fall into the discipline often referred to as "machine learning," which is a sub-discipline of artificial intelligence (also known as machine intelligence).

Such machine learning techniques may include, for example neural networks, inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers (either binary or multiple category classifiers) may issue a "score" indicating which category the data most closely matches. The score may provide an indication of how closely the data matches the category.

Training a machine learning component such as, in this case, a customer model, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used to train the model. For example, using the example described above, if a customer repeatedly purchases 10 lb bags of Gala apples and the input corresponds to "apples," it can be determined with high confidence that with the input of "apples," the customer actually means a 10 lb bags of Gala apples. Additional examples of training data are described below with reference to FIGS. 8 and 9. Similarly, examples relating to confidence score determination are described in further detail with reference to FIGS. 4-6.

Once the potential products and corresponding confidence scores are determined, the remote device may compare each of the confidence scores to a threshold value. The threshold value is selected to provide high confidence that a potential product is the desired product of the customer, and may change based on the type of product, the customer, etc. The remote device determines whether any of the confidence scores are greater than the threshold value, illustrated as block 216. When at least one confidence score is greater than the threshold value, the remote device adds the product corresponding to the highest confidence score to the customer's shopping cart, illustrated as block 218. The remote device may also notify the customer of the product being added to the customer's shopping cart, illustrated as block 220.

When none of the confidence scores of the potential products are greater than the threshold value, the remote device is not confident enough on which product the customer desires to purchase. Thus, the remote device may generate a list of potential products and add a prompt to the customer's shopping cart, prompting the customer to select a product, illustrated as block 222. The remote device may also notify the customer of the list of products being added to the customer's shopping cart, illustrated as block 220.

As described above, the remote device may generate or determine the list substantially at the time the remote device receives the input, and the list may be placed in the customer's shopping cart. The remote device may also store a prompt to generate or determine the list when the customer accesses the customer shopping cart. This ensures the list is up to date with the current availability data.

Figure 3:
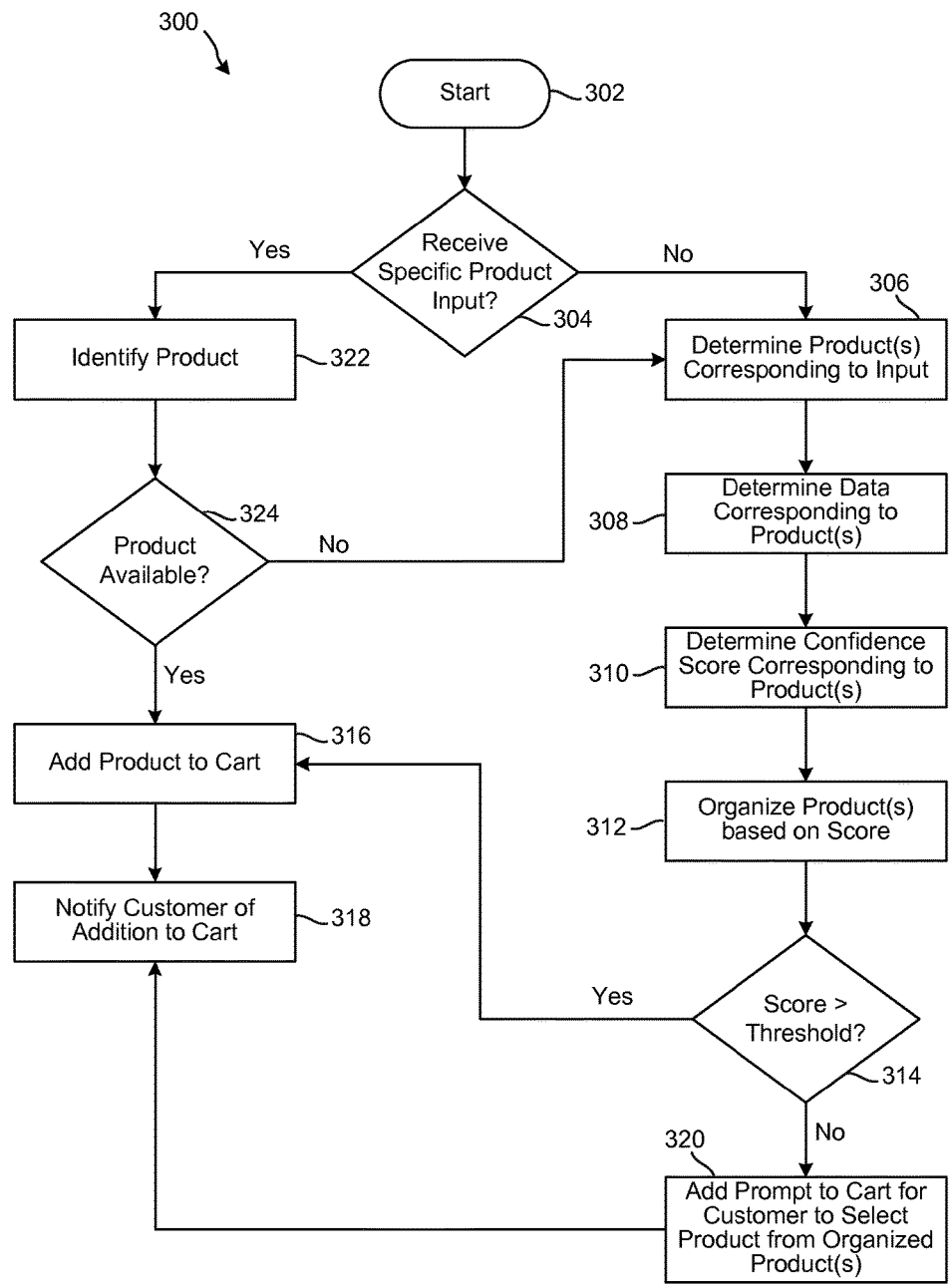
FIG. 3 illustrates another exemplary method of processing an input and updating an electronic shopping cart according to embodiments of the present disclosure.

FIG. 3 illustrates an exemplary method 300 of processing an input and updating an electronic shopping cart according to embodiments of the present disclosure. In block 302, the process starts. The customer device may receive and send an audio, text, or scan code input to the remote device. The remote device receives the input. The remote device then determines whether the input corresponds to a specific product (i.e., type, brand, size, etc.), illustrated as block 304. This may be determined based on a scan code, a text input, and/or the ASR/NLU and machine learning techniques described herein. When the input does not correspond to a specific product (for example, "apple" without a type, brand, size, etc.), the remote device may determine one or more potential products corresponding to the input, illustrated as block 306, and data corresponding to the potential products, illustrated as block 308. The remote device may also determine confidence scores corresponding to each potential product, illustrated as block 310. Again, these potential products and corresponding confidence scores may be determined based on the ASR/NLU and/or machine learning techniques described herein.

The remote device may organize the potential products in order of descending confidence score, illustrated s block 312, and determine whether any of the confidence scores are greater than the threshold value, illustrated as block 314. When at least one confidence score is greater than the threshold value, the remote device adds the product corresponding to the highest confidence score to the customer's shopping cart, illustrated as block 316. The remote device may also notify the customer of the product being added to the customer's shopping cart, illustrated as block 318. When none of the confidence scores of the potential products are greater than the threshold value, the remote device is not confident enough on which product the customer desires to purchase. Thus, the remote device may add a prompt to the customer's shopping cart, prompting the customer to select a potential product from the organized list of potential products, illustrated as block 320. The remote device may also notify the customer of the list of products being added to the customer's shopping cart, illustrated as block 318.

As described above, the remote device may generate or determine the list substantially at the time the remote device receives the input, and the list may be placed in the customer's shopping cart. The remote device may also store a prompt to generate or determine the list when the customer accesses the customer shopping cart. This ensures the list is up to date with the current availability data.

On the other hand, when the input does correspond to a specific product (for example, gala, apple, 10 lb bag, etc.), the remote device identifies the product, illustrated as block 322. The specific product may be determined based on scan code data, text data, and/or the ASR/NLU and/or machine learning techniques described herein. The remote device may then determine whether the specific product is available and/or in stock, illustrated as block 324. When the specific product is available, the remote device adds the specific product to the customer's shopping cart, illustrated as block 316. The remote device may also notify the customer of the specific product being added to the customer's shopping cart, illustrated as block 318.

However, when the specific product is unavailable or out of stock, the remote device may determine one or more potential equivalent products corresponding to the specific product identified in the input, illustrated as block 306, and data corresponding to the potential products, illustrated as block 308. For example, the remote device may resolve the name of the product, extract keywords, search for potential products based on the keywords, and generate a list of potential products. The remote device may also determine confidence scores corresponding to each potential product, illustrated as block 310. Again, these potential products and corresponding confidence scores may be determined based on the ASR/NLU and machine learning techniques described herein.

The remote device may then organize the potential products in order of descending confidence score, illustrated s block 312, and determine whether any of the confidence scores are greater than the threshold value, illustrated as block 314. When at least one confidence score is greater than the threshold value, the remote device adds the product corresponding to the highest confidence score to the customer's shopping cart, illustrated as block 316. The remote device may also notify the customer of the product being added to the customer's shopping cart, illustrated as block 318. When none of the confidence scores of the potential products are greater than the threshold value, the remote device is not confident enough on which product the customer desires to purchase. Thus, the remote device may add a prompt to the customer's shopping cart, prompting the customer to select a potential product from the organized list of potential products, illustrated as block 320. The remote device may also notify the customer of the list of products being added to the customer's shopping cart, illustrated as block 318.

Figure 4:
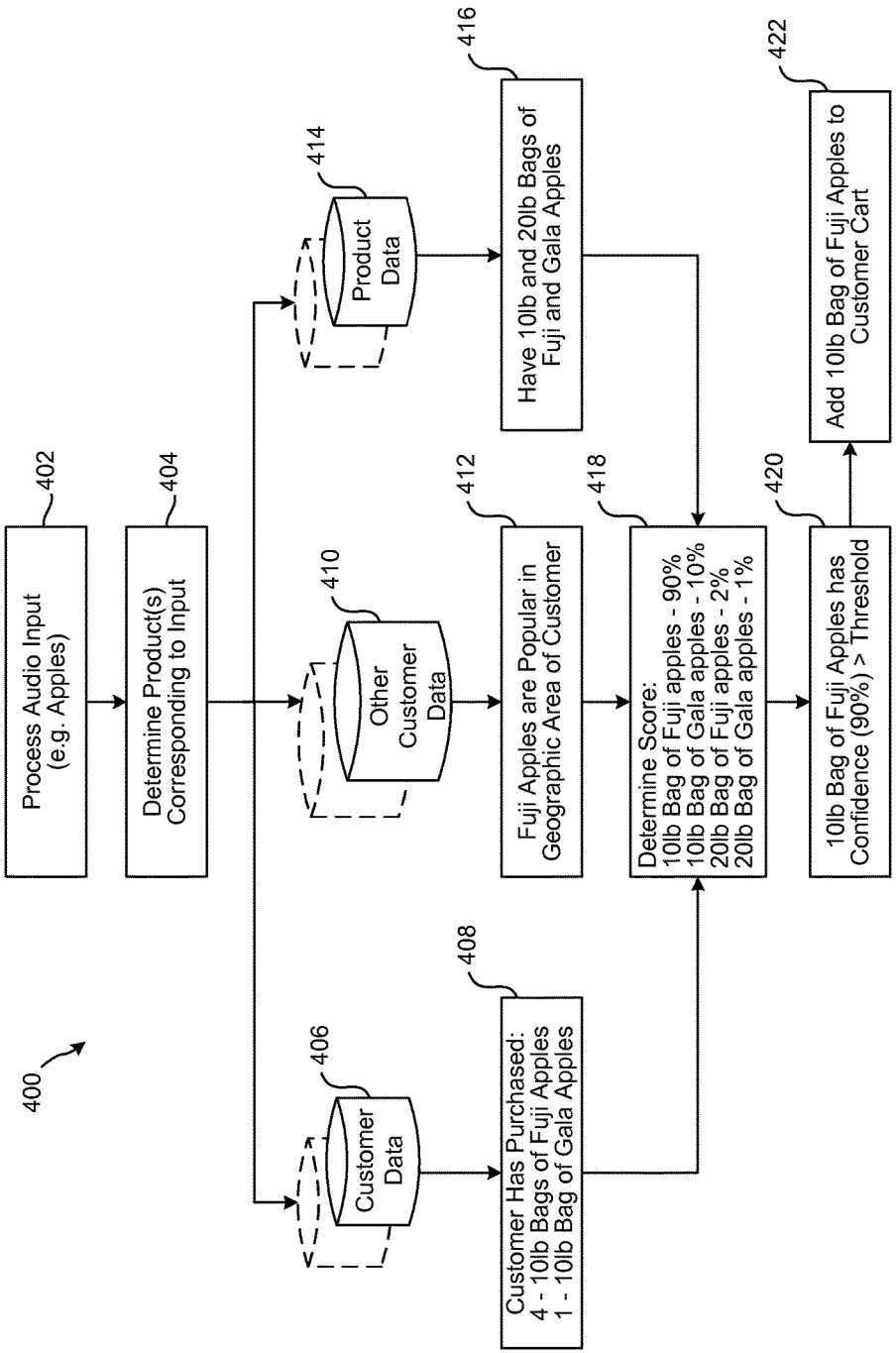
FIG. 4 illustrates an exemplary method of processing an audio input corresponding to a product for purchase according to embodiments of the present disclosure.
Figure 5:
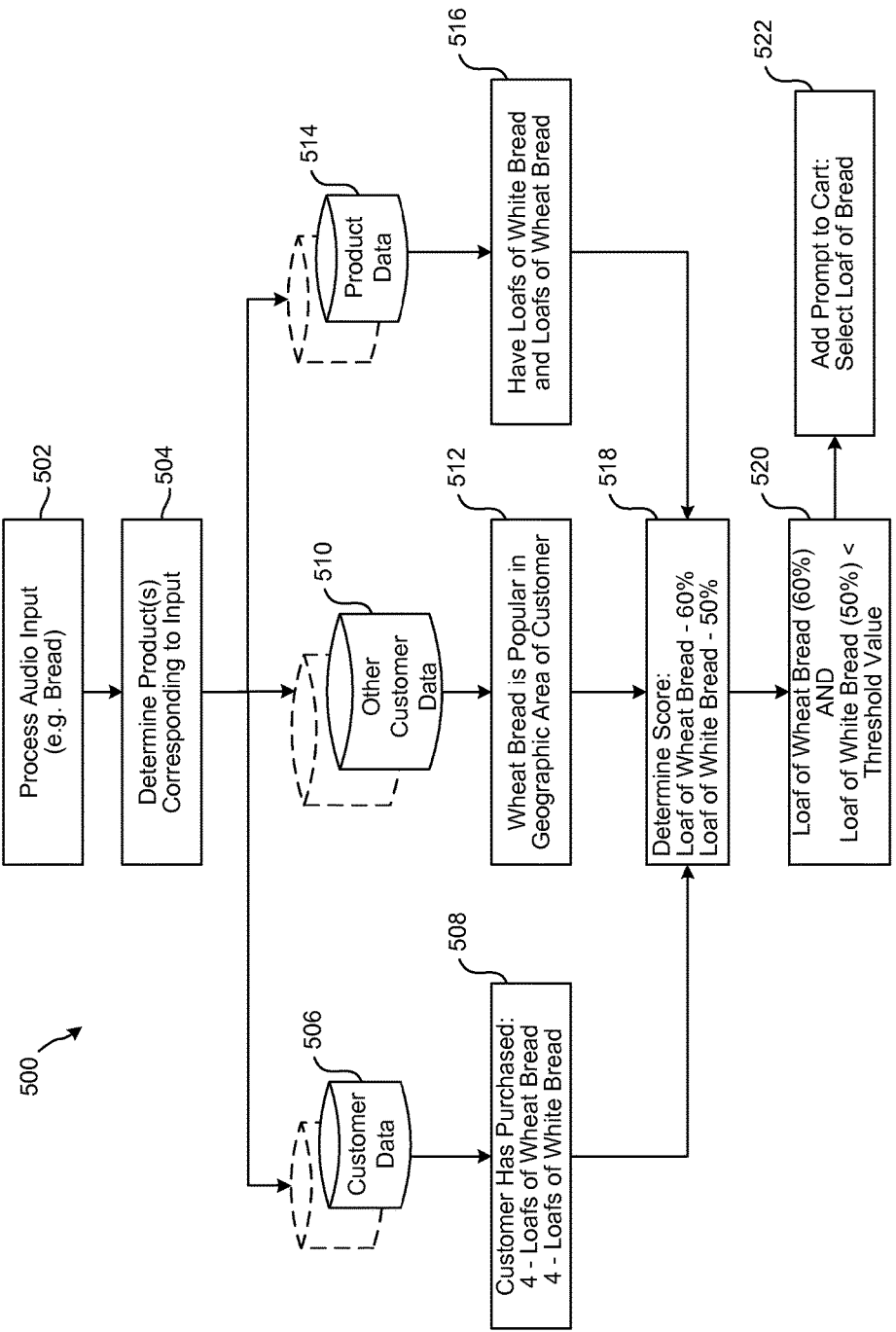
FIG. 5 illustrates another exemplary method of processing an audio input corresponding to a product for purchase according to embodiments of the present disclosure.
Figure 6:
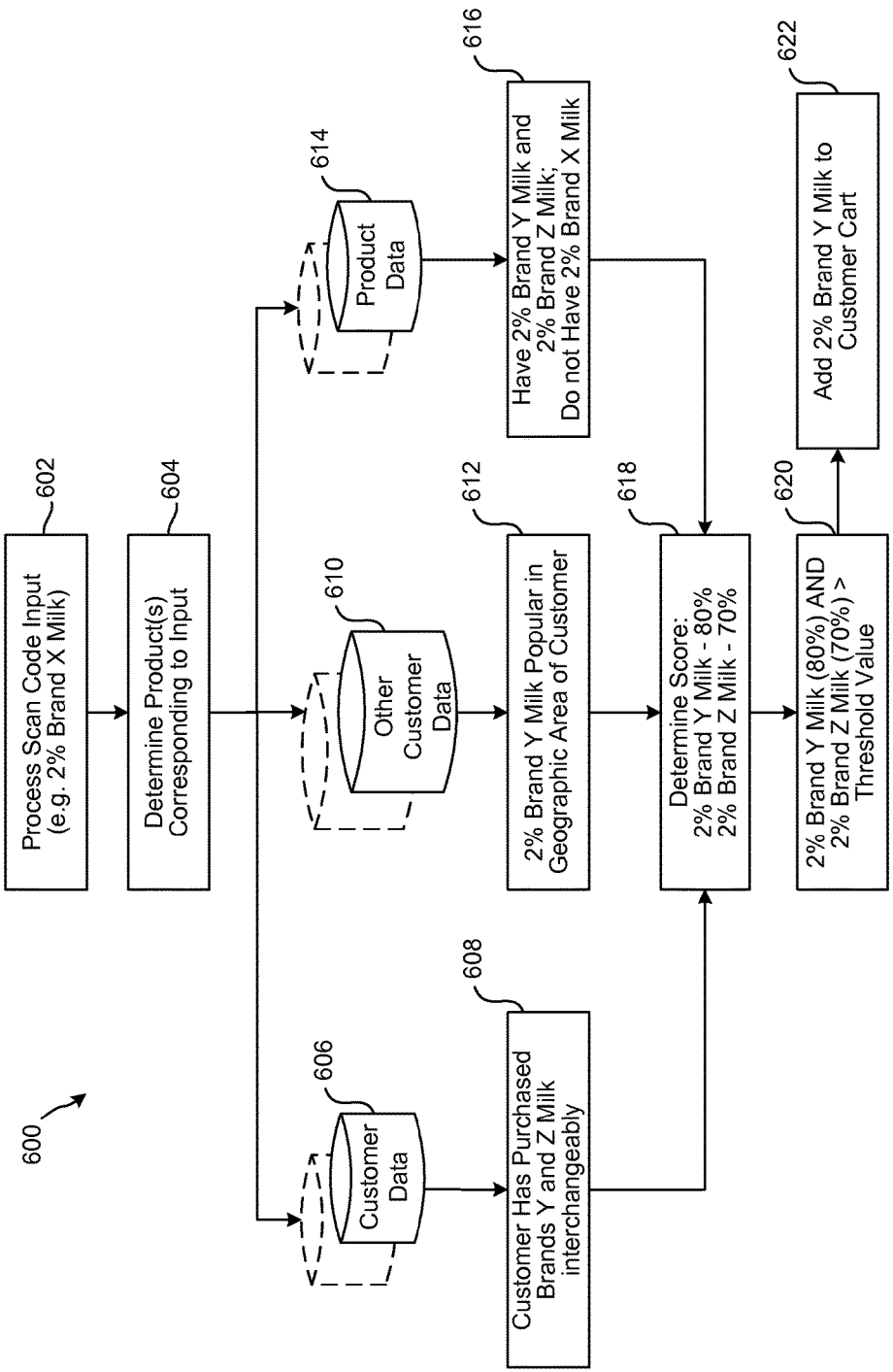
FIG. 6 illustrates an exemplary method of processing a scan code input corresponding to a product for purchase according to embodiments of the present disclosure.

FIGS. 4-6 illustrates examples of determining a product and adding the product to the customer's shopping cart in accordance with the disclosure. In example 400, the remote device processes the audio input, illustrated as block 402. In this example, the audio input corresponds to the text "apples." This may be determined using ASR/NLU processing. The remote device then determines one or more products corresponding to the input "apples," illustrated as block 404. This may be determined using ASR/NLU processing and machine learning techniques. For example, the remote device may process the input through customer data 406 and determine that the customer has purchased apples in the past, including 4 bags of Fuji apples most recently and 1 bag of Gala apples a while back, illustrated as block 408. The customer data 406 may include past purchase history, customer settings (such as "apples" means 10 lb bag of Fuji apples, etc.), customer preferences (such as vegetarian, vegan, preference for Fuji apples but Gala apples are acceptable, etc.), demographic data of the customer (such as location, wealth, etc.), etc.

The remote device may process the input through other customer data 410 and determine that Fuji apples are currently popular with other customers in a similar geographic region, illustrated as block 412. The other customer data 410 may include past purchase histories of other customers having a similar demographic, demographic data, etc.

The remote device may also process the input through product data 414 (also referred to as item data) and determine that 10 lb bags of Gala and Fuji apples are currently available, illustrated as block 416. The product data 414 may include data relating to various products, including name, brand, size, gluten free, vegetarian, vegan, etc.

Using this data and the potential products determined via ASR/NLU and machine learning, the remote device determines confidence scores for each potential product, illustrated as block 418. In this example, the 10 lb bag of Fuji apples has a high confidence (i.e., 90%) based on the customer's recent purchase of 4 10 lb bag of Fuji apples, the popularity of Fuji apples in the geographic region of the customer, and the availability of a 10 lb bag of Fuji apples. The 10 lb bag of Gala apples has a low confidence (i.e., 10%) based on the customer's past purchase of 1 10 lb bag of Gala apples a while ago, etc. The 20 lb bags of Fuji and Gala apples also have a low confidence (i.e., 2% and 1%, respectively) based on the customer not purchasing any 20lb bags of Fuji or Gala apples, etc.

The remote device may then compare the confidence scores of the potential products to the threshold value in order of highest confidence first. In this example, the confidence score of the 10 lb bag of Fuji apples has a confidence (i.e., 90%) that is greater than the threshold value, and that is higher than the confidence scores of all the other potential products, illustrated as block 420. Thus, the remote device is confident that the customer's audio input of "apples" intended to mean the purchase of a 10 lb bag of Fuji apples. The remote device then adds a 10 lb bag of Fuji apples to the customer's shopping cart, illustrated as block 422.

In example 500 illustrated in FIG. 5, the remote device processes the audio input, illustrated as block 502. In this example, the audio input corresponds to the text "bread." This may be determined using ASR/NLU processing. The remote device then determines one or more products corresponding to the input "bread," illustrated as block 504. This may be determined using ASR/NLU processing and machine learning techniques. For example, the remote device may process the input through customer data 506 and determine that the customer has purchased bread in the past, including 4 loafs of white bread and 4 loafs of wheat bread, illustrated as block 508. Similarly, the remote device may process the input through other customer data 510 and determine that wheat bread is currently popular with other customers in a similar geographic region, illustrated as block 512. The remote device may also process the input through product data 514 and determine that loafs of white and wheat bread are currently available, illustrated as block 516.

Using this data and the potential products determined via ASR/NLU and machine learning, the remote device determines confidence scores for each potential product, illustrated as block 518. In this example, the loaf of wheat bead has a confidence of 60% based on the customer's past purchase of 4 loafs of white bread and 4 loafs of wheat bread, the popularity of wheat bread in the geographic region of the customer, and the availability of white and wheat bread. Similarly, the loaf of white bread has a confidence of 50% based on the customer's past purchase of 4 loafs of white bread and 4 loafs of wheat bread, the popularity of wheat bread in the geographic region of the customer, and the availability of white and wheat bread.

The remote device may then compare the confidence scores of the potential products to the threshold value in order of highest confidence first. In this example, the confidence scores of the loafs of white and wheat bread are close to one another and neither is greater than the threshold value, illustrated as block 520. Thus, the remote device is not confident enough to determine which type of bread the customer's audio input of "bread" intended to purchase. The remote device therefore adds a prompt to the customer's shopping cart prompting the customer to select a loaf of bread, illustrated as block 522.

In example 600 illustrated in FIG. 6, the remote device processes the scan code input, illustrated as block 602. In this example, the scan code input corresponds to a specific product, a gallon of Brand X 2% milk. This may be determined by interpreting the data contained in the scan code. The remote device then determines one or more products corresponding to the specific product, illustrated as block 604. In this example, Brand X 2% milk is unavailable, thus the remote device may identify potential equivalent products the customer may desire to purchase instead. This may be determined using ASR/NLU processing and machine learning techniques. For example, the remote device may process the input through customer data 606 and determine that the customer has purchased milk in the past, including Brand Y 2% milk and Brand Z 2% milk interchangeably, illustrated as block 608. Similarly, the remote device may process the input through other customer data 610 and determine that Brand Y 2% milk is currently popular with other customers in a similar geographic region, illustrated as block 612. The remote device may also process the input through product data 614 and determine that Brand X 2% milk is currently unavailable, but Brand Y 2% milk and Brand Z 2% milk are currently available, illustrated as block 616.

Using this data and the potential products determined via ASR/NLU and machine learning, the remote device determines confidence scores for each potential product, illustrated as block 618. In this example, a gallon of Brand Y 2% milk has a confidence of 80% based on the customer's past purchase history, the popularity of Brand Y 2% milk, and the availability of Brand Y 2% milk. Similarly, a gallon of Brand Z 2% milk has a confidence of 70% based on the customer's past purchase history, the popularity of Brand Y 2% milk, and the availability of Brand Z 2% milk.

The remote device may then compare the confidence scores of the potential products to the threshold value in order of highest confidence first. In this example, the confidence scores of the Brand Y and Brand Z milk are close to one another and both are greater than the threshold value. However, the customer has purchased Brand Y and Brand X milk interchangeably, which indicates that the customer has no preference for which Brand of milk is purchased, illustrated as block 620. Thus, the remote device simply adds the product with the highest confidence score, a gallon of Brand Y 2% milk, to the customer's shopping cart, illustrated as block 622. The remote device may also allow the customer to change the product when the customer access the shopping cart.

Figure 7:
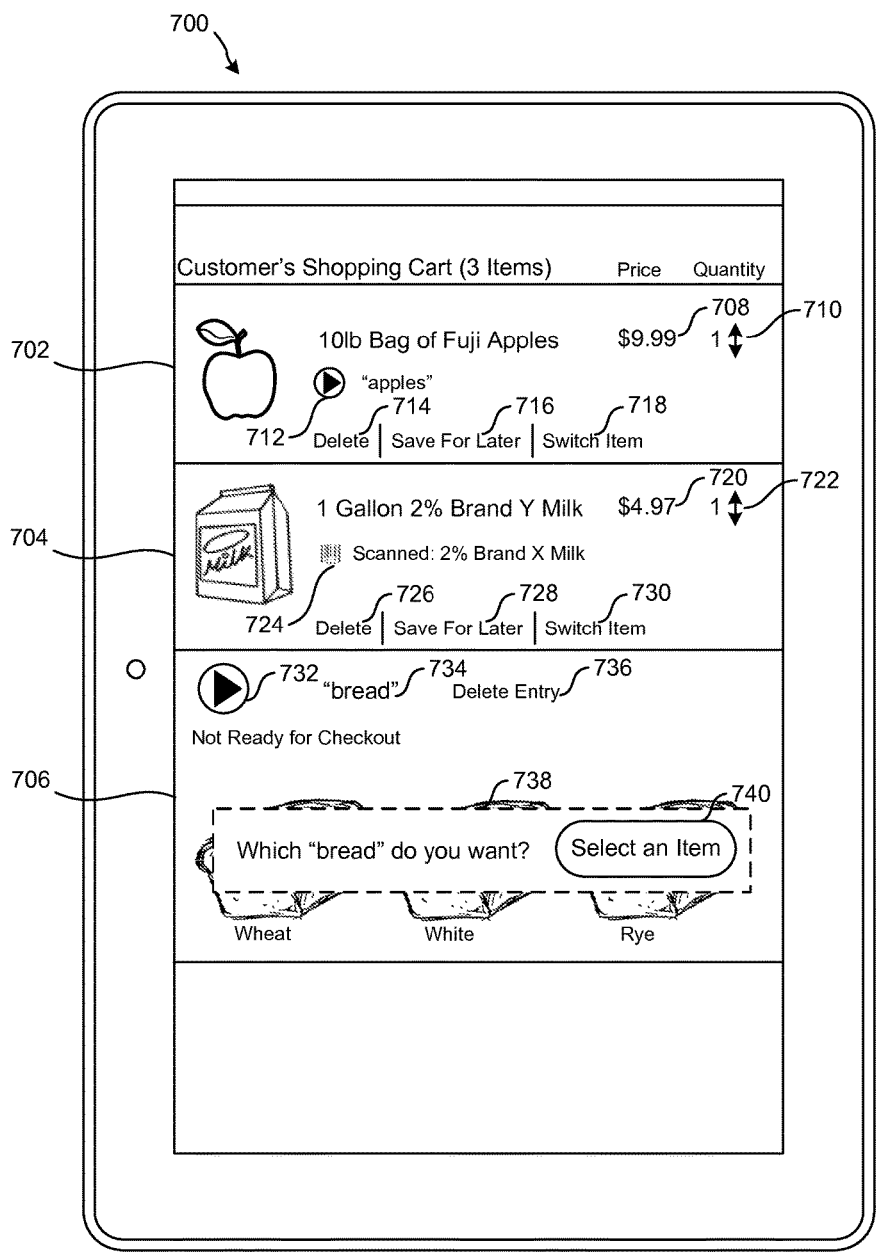
FIG. 7 illustrates an exemplary display of an electronic shopping cart according to embodiments of the present disclosure.

FIG. 7 illustrates a graphical user interface 700 displaying a customer shopping cart on a device of the customer, such as smartphone 108, according to embodiments of the present disclosure. In keeping with the examples described with reference to FIGS. 4-6, the products of a 10lb bag of Fuji apples, a gallon of Brand Y 2% milk, and a prompt for the customer to select a loaf of white bread or a loaf of wheat bread are illustrated in the customers shopping cart.

Accordingly, the graphical user interface 700 includes 3 items, including a first item 702 of 10 lb bag of Fuji apples, a second item 704 of a gallon of Brand Y 2% milk, and a third item 706 for the customer to select a loaf of bread. The first item 702 may include a number of aspects. For example, the first item 702 may include an illustration of the product, a description of the product (i.e., 10 lb bag of Fuji apples), as known in the art. The first item 702 may also include a price 708 and a selectable quantity 710 that may be increased or decreased by the consumer. It should be appreciated that the quantity may be based on the input described above. For example, if the customer provided audio input of "two bags of apples," the quantity 710 may read "2" instead of "1". The first item 702 may further include a selectable play button 712 along with a textual depiction of the audio input (i.e., "apples"). This allows the customer to view what audio input the customer provided and play the audio input back to the customer if the customer so desires. One or more selectable commands may also be provided, such as a selectable delete command 714, a selectable save for later command 716, and a selectable switch item command 718. The delete command 714, if selected may remove the first item 702 from the customer's shopping cart. The save for later command 716, if selected, may move the first item 702 to a saved section, which the customer may access to purchase the first item 702 at a later time. The switch item command 718, if selected, may provide the customer with additional similar products, such as potential products determined during the processing of the audio input, that the customer may select to replace the first item 702.

In a similar fashion, the second item 704 may include an illustration of the product, a description of the product (i.e., 1 Gallon 2% Brand Y Milk), as known in the art. The second item 704 may also include a price 720 and a selectable quantity 722 that may be increased or decreased by the consumer. The second item 704 may further include a depiction of the scan code input 724 optionally along with a textual depiction of the scan code input (i.e., "2% Brand X Milk"). This may allow the customer to view what input the customer provided. One or more selectable commands may also be provided, such as a selectable delete command 726, a selectable save for later command 728, and a selectable switch item command 730, which function as described above.

The third item 706 may include a selectable play button 730 along with a textual depiction of the audio input (i.e., "bread" 734). As described above, this allows the customer to view what audio input the customer provided and play the audio input back to the customer if the customer so desires. One or more selectable commands may also be provided, such as a selectable delete entry command 736. The delete entry command 736, if selected may remove the third item 706 from the customer's shopping cart. The third item 706 may also include illustrations and descriptions of the potential products determined by the processing of the audio input. These may be covered by a prompt 738, for example, stating "Which "bread" do you want?" and a selectable button 740, that when selected removes the prompt 738 and allows the customer to select the potential product the customer desires. For example, a loaf of wheat bread, a loaf of white bread, or optionally another option, such as a loaf of rye bread.

In other embodiments, for example, when the customer input corresponds to a meal or prepared dish, such as 'spaghetti', a number of ingredients may be added to the shopping cart under a heading for spaghetti. For example, noodles, tomatoes, meat, salt, etc. Each ingredient may be added in an appropriate quantity based on a recipe for spaghetti, and each ingredient may include a selectable delete command, a selectable save for later command, and a selectable switch item command. The recipe and ingredients may be determined using the ASR/NLU and machine learning techniques. For example, there are many recipes for spaghetti, but based on the customer data, and other data, it may be determined that the recipe should be vegan, feed 4 people, and the noodles should be made from scratch, etc. Thus, the proper ingredients may be added in the appropriate quantity. The user interface may also allow the customer to change or select which recipe the customer desires.

Figure 8:
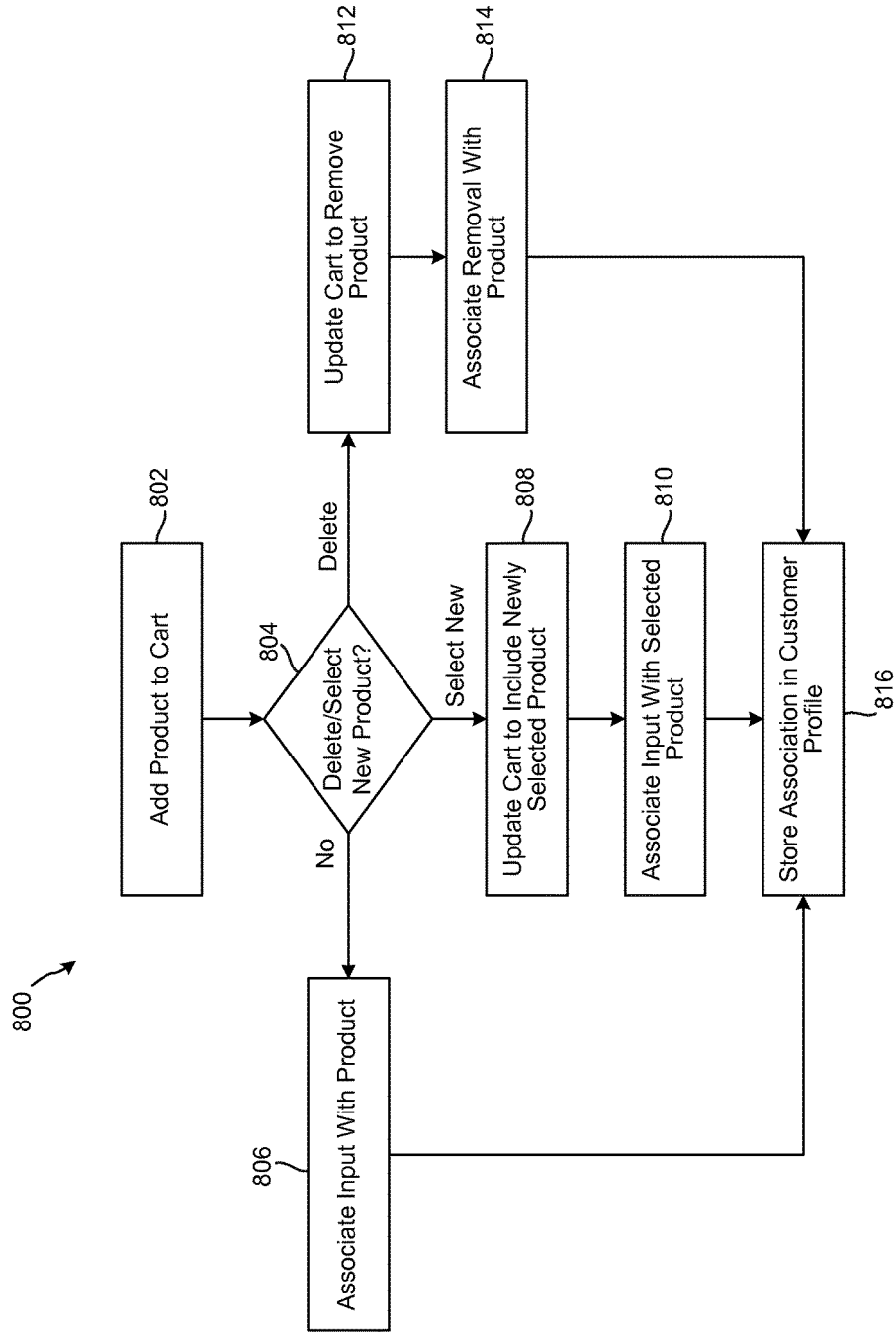
FIG. 8 illustrates an exemplary method of associating a product with an input according to embodiments of the present disclosure.
Figure 9:
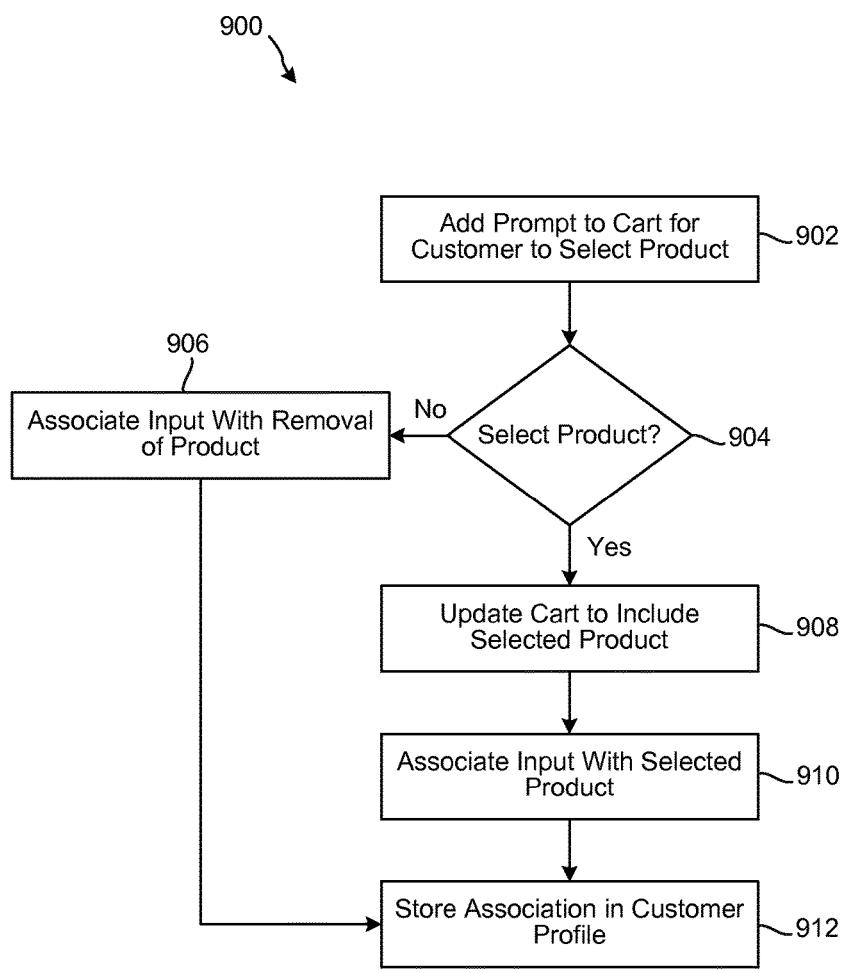
FIG. 9 illustrates another exemplary method of associating a product with an input according to embodiments of the present disclosure.

It should be appreciated that every time a customer makes a purchase, changes an item or product, removes an item or product, saves an item or product for later, etc. this data may be used to train a model for the customer and fed back into the machine learning or other algorithm update mechanisms. FIGS. 8 and 9 illustrate example method of how such actions can be used and associated with certain products in a model for the customer. Referring to FIG. 8, a method 800 for utilizing a change of a product is described. In block 802, the remote device adds a product to the customer's shopping cart. This action may be performed using the systems, devices, and methods described herein. After the product is added to the customer's shopping cart, the customer may delete the product, change the product and/or select a new product to replace the product in the shopping cart, illustrated as block 804. When the customer makes no change to the product and purchases the product, the purchased product may be associated with the input (such as the audio input) received, illustrated as block 806. When the customer changes the product and/or selects a new product to replace the product in the shopping cart and purchases the new product, the shopping cart may be updated with the new product, illustrated as block 808. In this case, the addition of the initial product may have been incorrect, and the change of the product can be used to train the machine learning process. In this respect, the input (such as the audio input) may be associated with the new product selected by the customer, illustrated as block 810. When the customer simply removes the product from the shopping cart, the shopping cart may be updated to reflect the removal of the product, illustrated as block 812. In this case, the addition of the initial product may have been incorrect, and the removal of the product can be used to train the machine learning process. In this respect, the input (such as the audio input) may be associated with the removal of the product by the customer, illustrated as block 812. The association(s) (e.g., in block 806, 810, and 814) may then be stored in the customer profile and/or model for the customer, illustrated as block 816. The association(s) may then be fed back into the machine learning techniques as a factor considered by the machine learning algorithm(s).

Referring to FIG. 9, a method 900 for utilizing a selection of a product from a prompt is described. In block 902, the remote device adds a prompt to the customer's shopping cart. This action may be performed using the systems, devices, and methods described herein. After the prompt is added to the customer's shopping cart, the customer may select a product to add to the shopping cart in place of the prompt, illustrated as block 904. When the customer makes no selection and instead removes the products and/or prompt, this removal may be associated with the input (such as the audio input) received, illustrated as block 906. On the other hand, when the customer selects a specific product to replace the prompt in the shopping cart, the shopping cart may be updated with the selected product, illustrated as block 908. In this case, the input (such as the audio input) may be associated with the selected product, illustrated as block 910. The association (either in block 906 and 910) may then be stored in the customer profile and/or model for the customer, illustrated as block 912. The association(s) may then be fed back into the machine learning techniques as a factor considered by the machine learning algorithm(s). The more actions and/or purchases, the customer performs, the more accurate the machine learning algorithm(s) becomes.

Figure 10:
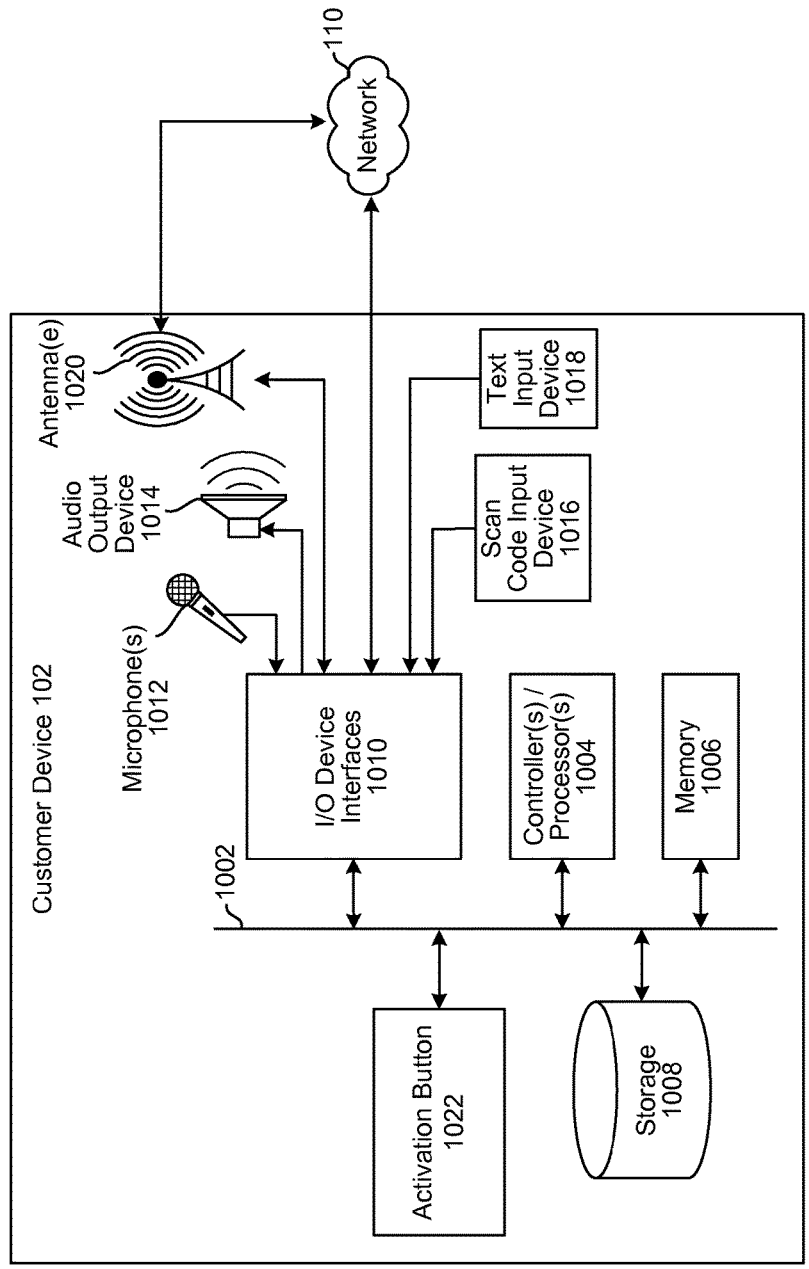
FIG. 10 is a block diagram conceptually illustrating an exemplary customer device according to embodiments of the present disclosure.

In certain aspects, the devices, systems, and method may be implemented in one or more computing devices. FIG. 10 is a block diagram conceptually illustrating example components of the customer device 102. In operation, the customer device 102 may include computer-readable and computer-executable instructions that reside on the customer device 102, as will be discussed further below.

The customer device 102 may include an address/data bus 1002 for conveying data among components of the customer device 102. Each component within the customer device 102 may also be directly connected to other components in addition to (or instead of) being connected to other components across the bus 1002.

The customer device 102 may include one or more controllers/processors 1004 that may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The customer device 102 may also include a data storage component 1008, for storing data and controller/processor-executable instructions (e.g., instructions to perform the algorithms and methods illustrated in and described with reference to FIGS. 1-9). The data storage component 1008 may include one or more non-volatile storage types such as magnetic storage, optical storage, solid-state storage, etc. The customer device 102 may also be connected to removable or external non-volatile memory and/or storage (such as a removable memory card, memory key drive, networked storage, etc.) through input/output device interfaces 1010.

Computer instructions for operating the customer device 102 and its various components may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The customer device 102 includes input/output device interfaces 1010. A variety of components may be connected through the input/output device interfaces 1010, such as one or more audio capture device(s), such as a microphone or an array of microphones 1012, for receiving and capturing audio input and other audio. The customer device 102 may include an audio output device for producing sound, such as speaker(s) 1014. The audio capture device(s) and/or the audio output device may be integrated into the customer device 102 or may be separate.

The customer device 102 may also include a scan code input device 1016 for scanning codes on products, such as a barcode scanner. The customer device 102 may also include a text input device 1018 for receiving text input, such as a keyboard or touch screen. The scan code input device 1016 and/or the text input device 1018 may be integrated into the customer device 102 or may be separate.

The input/output device interfaces 1010 may also include an interface for an external peripheral device connection such as universal serial bus (USB), FireWire, Thunderbolt or other connection protocol. The input/output device interfaces 1010 may also include a connection to one or more networks 110 via an antennae 1020, Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The customer device 102 may further include an activation button 1022 for use in activating the customer device 102. The storage 1008 may store data (for example, recorded audio input, scan codes, and/or text input) for use in transmitting the input to the remote device 106.

The customer device 102 may include all or a subset of the components described above. FIGS. 1-9 illustrate exemplary methods of processing the captured audio containing a key word and/or audible command according to embodiments of the present disclosure. The customer device 102 may be a standalone device, a smartphone, laptop computer, desktop computer, tablet computer, or other type of computing device, etc. It should be appreciated that each of the methods described with reference to FIGS. 1-9 may be combined with one or more of the other methods, and one or more steps of a methods may be incorporated into the other methods. Further, one or more of the components described above with reference to FIG. 10 may be used to perform one or more of the steps of the methods described herein.

Figure 11:
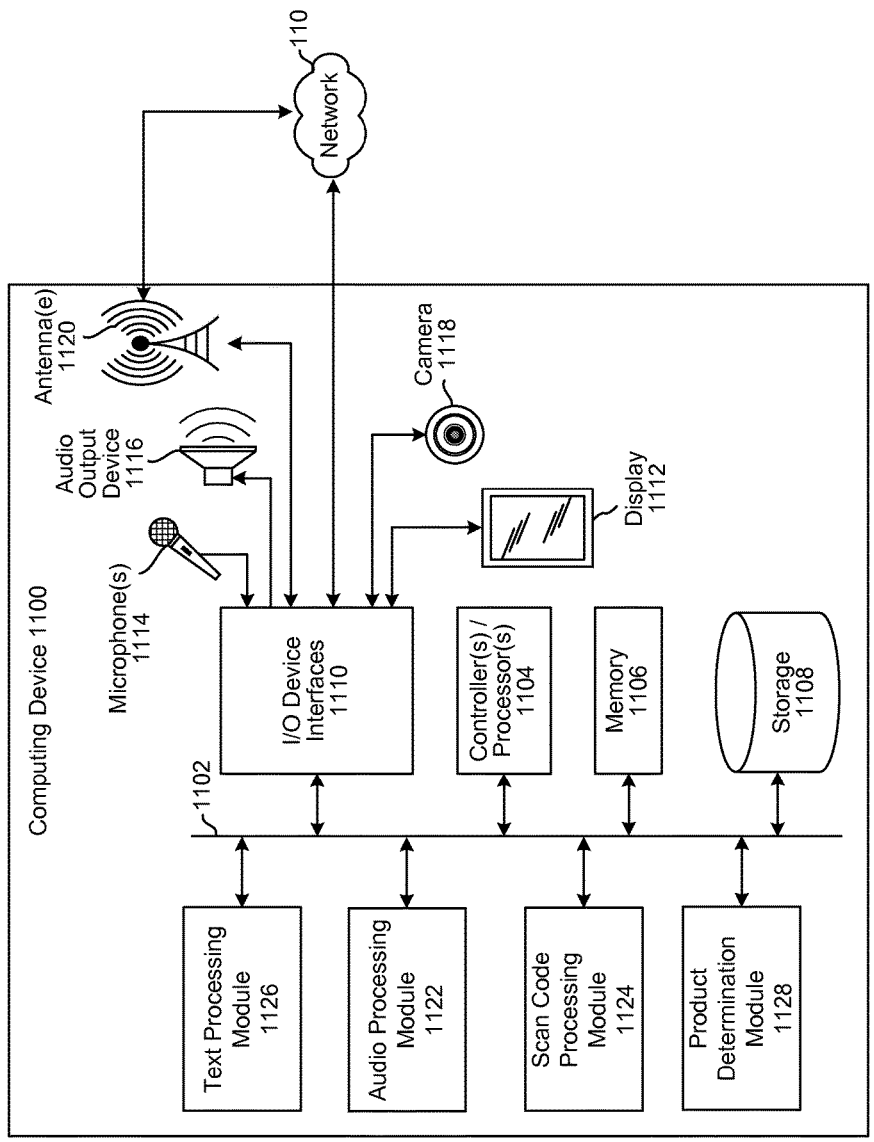
FIG. 11 is a block diagram conceptually illustrating an exemplary remote device according to embodiments of the present disclosure.

In an example, FIG. 11 is a block diagram conceptually illustrating example components of a computing device 1100, which may be the remote device 106 and/or the smartphone 108. In operation, the computing device 1100 may include computer-readable and computer-executable instructions that reside on the computing device 1100, as discussed further below.

The computing device 1100 may include an address/data bus 1102 for conveying data among components of the computing device 1100. Each component within the computing device 1100 may also be directly connected to other components in addition to (or instead of) being connected to other components across the bus 1102.

The computing device 1100 may include one or more controllers/processors 1104 that may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The computing device 1100 may also include a data storage component 1108, for storing data and controller/processor-executable instructions (e.g., instructions to perform the algorithms and methods illustrated in and described above with reference to FIGS. 1-9). The data storage component 1108 may include one or more non-volatile storage types such as magnetic storage, optical storage, solid-state storage, etc. The computing device 1100 may also be connected to removable or external non-volatile memory and/or storage (such as a removable memory card, memory key drive, networked storage, etc.) through input/output device interfaces 1110.

Computer instructions for operating the computing device 1100 and its various components may be executed by the controller(s)/processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The computing device 1100 includes input/output device interfaces 1110. A variety of components may be connected through the input/output device interfaces 1110, such as a display 1112, one or more audio capture device(s) (such as a microphone or an array of microphones 1114), an audio output device for producing sound (such as speaker(s) 1116), a camera 1118, and/or other such components. The input/output device interfaces 1110 may also include an interface for an external peripheral device connection such as universal serial bus (USB), FireWire, Thunderbolt or other connection protocol. The input/output device interfaces 1110 may also include a connection to one or more networks 110 via an antennae 1120, Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The display 1112 may be a display of any suitable technology, such as a liquid crystal display, an organic light emitting diode display, electronic paper, an electrochromic display, a cathode ray tube display, a pico projector or other suitable component(s). The camera 1118 and the display 1112 may be integrated into the computing device 1100 or may be separate.

The computing device 1100 may further include an audio processing module 1122 that receives the captured audio input and any additional audio captured in the recording from the customer device, and processes the audio using the ASR and NLU techniques described above. The storage 1108 may store data, for example, audio fingerprints, comparison audio or other data, models, etc., for use in performing the ASR/NLU processing. Although illustrated as incorporated within the computing device 1100, the storage 1108 may include multiple databases and may be located separately and accessed by the computing device 1100 (for example, over network 110). The computing device 1100 may also be programmed with language models specific to the customer's language and accent for the geographic region of the customer.

The techniques disclosed herein, including the audio processing module 1122 may be implemented in any language. The databases and keywords in the database may also be in the same language as the input. Thus, when audio/text/or data on a scan code is received in English language; English language databases and keywords, etc. are used to search for products, identify products, and add products to a customer's shopping cart. Similarly, when audio/text/or data on a scan code is received in Russian; Russian language databases and keywords, etc. are used to search for products, identify products, and add products to a customer's shopping cart.

The computing device 1100 may include a scan code processing module 1124 that receives the scan code input and processes the scan code input to determine data corresponding to the scan code (such as product name, model number, brand, type, size, etc.). This data may also be processed by the audio processing module using the NLU techniques described above. The storage 1108 may store data, for example, known products and their associated scan code data for matching the received scan code to a known product.

The computing device 1100 may include a text processing module 1126 that receives the text input from the customer device, and processes the text, for example, using the NLU techniques described above. The text processing module 1126 may determine data corresponding to the text (such as product name, model number, brand, type, size, etc.). The storage 1108 may store data, for example, known products and their associated keywords for searching and matching the text to one or more known products.

The computing device 1100 may include a product determination module 1128 that receives the results from the ASR and NLU techniques of the audio processing module 1122, the results from the scan code processing module 1124, and/or the results from the text processing module 1126 described above. The product determination module 1128 may search the database(s) described herein to identify one or more products potentially matching the input. The product determination module 1128 may also implement the machine learning and process the results and determine products and confidence scores, as described above, based on the input, items and products returned by a search using the input, the customer demographic data (age, geographic information, financial information etc.), customer identification, customer profile, individual past purchases, results from the ASR and NLU processing, collective purchase histories, demographic data, behavior of similar customers, product data (name, brand, size, organic, non-organic, gluten free, vegetarian, vegan, etc.). The product determination module 1128 may be a single module or may include multiple modules to perform the various steps and functions described herein. The storage 1108 may store all the data described above, for example, customer profiles, customer data, demographic data, past purchase histories, product purchase histories, customer product changes, removals, selections, etc., for use in performing the machine learning processing.

The computing device 1100 may include all or a subset of the components described above. Through the network 110, the computing device 1100 may communicate with the customer device 102 and smartphone 108 in a networked environment. The components of the computing device 1100 as illustrated in FIG. 11 is exemplary, and may be a stand-alone device or may be included, in whole or in part, as a component of a larger device or system.

Through the network 110, one or more components may be distributed across a networked environment. For example, multiple computing devices (such as the customer device 102, smartphone 108, and remote device 104) may be employed in a system. In such a multi-device system, each of the computing devices 1100 and customer device 102 may include different components for performing different aspects of the processes described herein. The multiple devices may include overlapping components.

Figure 12:
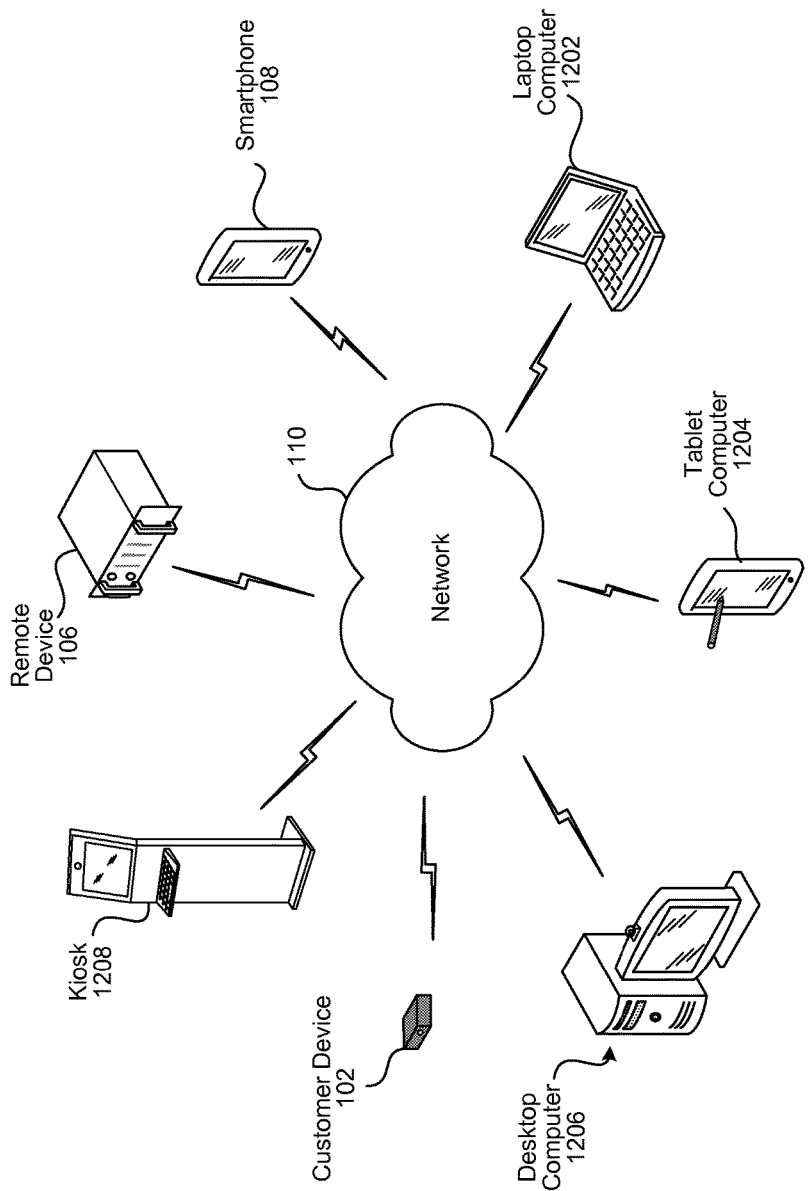
FIG. 12 illustrates a computer network for use with distributed processing according to embodiments of the present disclosure.

As illustrated in FIG. 12, multiple devices (102, 106, 108, etc.) may contain components of the system and the devices may be connected over the network 110. The network 110 is representative of any type of communication network, including data and/or voice network, and may be implemented using wired infrastructure (e.g., cable, CATS, fiber optic cable, etc.), a wireless infrastructure (e.g., WiFi, RF, cellular, microwave, satellite, Bluetooth, etc.), and/or other connection technologies. Devices may thus be connected to the network 110 through either wired or wireless connections. Network 110 may include a local or private network or may include a wide network such as the internet. In an example, the customer device 102, remote device 106, smartphone 108, may be connected to the network 110 through a wireless service provider, over a WiFi or cellular network connection or the like. Other devices, such as laptop computer 1202, tablet computer 1204, desktop computer 1206, and/or kiosk 1208 may connect to the network 110 through a wired connection or wireless connection.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving, from a first device, audio data representing speech;
    determining, based on items in a database, a first item potentially corresponding to the speech;
    determining a first value representing a likelihood that the first item corresponds to the speech;
    determining the first value is lower than a threshold value;
    determining, based on the database, a second item potentially corresponding to the speech;
    adding the first item and the second item to an electronic shopping cart;
    associating a portion of the audio data with the electronic shopping cart, the portion of the audio data being playable via a user interaction with the electronic shopping cart; and
    providing a prompt requesting selection of at least one of the first item or the second item.

2. The computer-implemented method of claim 1, further comprising:
    receiving, from the first device, first data representing a scan code;
    determining, based on the database, a third item potentially corresponding to the scan code;
    adding the third item to the electronic shopping cart; and
    providing a second prompt indicating the third item has been added to the electronic shopping cart.

3. The computer-implemented method of claim 1, further comprising:
    determining a second value representing a second likelihood that the second item corresponds to the speech; and
    determining the first value is greater than the second value.

4. The computer-implemented method of claim 1, wherein the first value is based on one or more of a purchase history of the user, the audio data, demographic data of the user, collective purchase histories of a first plurality of users in a geographic region, or purchasing behavior of a second plurality of users substantially matching the demographic data.

5. The computer-implemented method of claim 1, further comprising:
receiving first data representing a user input;
determining, based on the database, a third item corresponding to the user input;
determining the third item is unavailable for purchase;
determining, using the database, a fourth item;
determining a second value representing a second likelihood that the fourth item corresponds to the third item;
determining the second value satisfies the threshold value; and
adding the fourth item to the electronic shopping cart.

6. The computer-implemented method of claim 1, wherein:
determining the second item is further based on one or more of a purchase history of the user, the audio data, demographic data of the user, collective purchase histories of a first plurality of users in a geographic region, or behavior of a second plurality of users substantially matching the demographic data.

7. The computer-implemented method of claim 1, further comprising:
receiving, from the first device, first data representing a user input selecting the first item; and
causing shipment of the first item.

8. The computer-implemented method of claim 1, further comprising;
determining text data representing the audio data; and
determining at least one of a product name, product type, or model number represented in the text data.

9. The computer-implemented method of claim 1, further comprising:
receiving second audio data representing second speech, the second speech indicating a desired item;
determining a third item in the database based on the second audio data;
determining a second value representing a second likelihood that the third item matches the desired item;
determining a fourth item in the item database based on the second audio data;
determining a third value representing a third likelihood that the fourth item matches the desired item;
determining the second value is greater than the threshold value;
determining the second value is greater than the third value;
adding the third item to the electronic shopping cart; and
sending, to the first device, a message indicating the third item has been added to the electronic shopping cart.

10. The computer-implemented method of claim 1, further comprising:
receiving, from the first device, first data representing a user input;
determining an item type associated with the user input;
determining, using the database and the item type, a third item potentially corresponding to the user input;
determining a second value representing a second likelihood that the third item corresponds to the user input;
determining a second threshold value associated with the item type;
determining the second value fails to satisfy the second threshold value;
based at least in part on fourth item data in the item database, determining a fourth item potentially corresponding to the user input;
adding the third item to the electronic shopping cart;
adding the fourth item to the electronic shopping cart; and
providing a second prompt requesting selection of at least one of the third item or the fourth item.

11. A system, comprising:
at least one processor;
at least one memory including instructions that, when executed by the at least one processor, cause the system to:
receive, from a first device, audio data representing speech;
determine, based on items in a database, a first item potentially corresponding to the speech;
determine a first value representing a likelihood that the first item corresponds to the speech;
determine the first value is lower than a threshold value;
determine, based on the database, a second item potentially corresponding to the speech;
add the first item and the second item to an electronic shopping cart;
associate a portion of the audio data with the electronic shopping cart, the portion of the audio data being playable via a user interaction with the electronic shopping cart; and
provide a prompt requesting selection of at least one of the first item or the second item.

12. The system of claim 11, wherein the at least one memory further includes instructions that, when executed by the at least one processor, further causes the system to:
determine a second value representing a second likelihood that the second item corresponds to the speech; and
determine the first value is greater than the second value.

13. The system of claim 11, wherein the first value is based on one or more of a purchase history of the user, the audio data, demographic data of the user, collective purchase histories of a first plurality of users in a geographic region, or purchasing behavior of a second plurality of users substantially matching the demographic data.

14. The system of claim 11, wherein the at least one memory further includes instructions that, when executed by the at least one processor, further causes the system to:
receive first data representing a user input;
determine, based on the database, a third item corresponding to the user input;
determine the third item is unavailable for purchase;
determine, using the database, a fourth item;
determine a second value representing a second likelihood that the fourth item corresponds to the third item;
determine the second value satisfies the threshold value; and
add the fourth item to the electronic shopping cart.

15. The system of claim 11, wherein the at least one memory further includes instructions that, when executed by the at least one processor, further causes the system to:
determine the second item further based on one or more of a purchase history of the user, the audio data, demographic data of the user, collective purchase histories of a first plurality of users in a geographic region, or behavior of a second plurality of users substantially matching the demographic data.

16. The system of claim 11, wherein the at least one memory further includes instructions that, when executed by the at least one processor, further causes the system to:

receive, from the first device, first data representing a user input selecting the first item; and
cause shipment of the first item.

17. The system of claim 11, wherein the at least one memory further includes instructions that, when executed by the at least one processor, further causes the system to:
    determine text data representing the audio data; and
    determining at least one of a product name, product type, or model number represented in the text data.

18. The system of claim 11, wherein the at least one memory further includes instructions that, when executed by the at least one processor, further causes the system to:
    receive second audio data representing second speech, the second speech indicating a desired item;
    determine a third item in the database based on the second audio data;
    determine a second value representing a second likelihood that the third item matches the desired item;
    determine a fourth item in the item database based on the second audio data;
    determine a third value representing a third likelihood that the fourth item matches the desired item;
    determine that the second value is greater than the threshold value;
    determine the second value is greater than the third value;
    add the third item to the electronic shopping cart; and
    send, to the first device, a message indicating the third item has been added to the electronic shopping cart.

19. The system of claim 11, wherein the at least one memory further includes instructions that, when executed by the at least one processor, further causes the system to:
    receive, from the first device, first data representing a user input;
    determine an item type associated with the user input;
    determine, using the database and the item type, a third item potentially corresponding to the user input;
    determine a second value representing a second likelihood that the third item corresponds to the user input;
    determine a second threshold value associated with the item type;
    determine the second value fails to satisfy the second threshold value;
    based at least in part on fourth item data in the item database, determine a fourth item potentially corresponding to the user input;
    add the third item to the electronic shopping cart;
    add the fourth item to the electronic shopping cart; and
    provide a second prompt requesting selection of at least one of the third item or the fourth item.

20. The system of claim 11, wherein the at least one memory further includes instructions that, when executed by the at least one processor, further causes the system to:
    receive, from the first device, first data representing a scan code;
    determine, based on the database, a third item potentially corresponding to the scan code;
    add the third item to the electronic shopping cart; and
    provide a second prompt indicating the third item has been added to the electronic shopping cart.

* * * * *